United States Patent
Kim et al.

(10) Patent No.: US 11,989,957 B2
(45) Date of Patent: May 21, 2024

(54) APPARATUS FOR CONTROLLING OBJECT TRACKING AND METHOD THEREFOR

(71) Applicants: Hyundai Motor Company, Seoul (KR); KIA Corporation, Seoul (KR); Incheon National University Research & Business Foundation, Incheon (KR)

(72) Inventors: Young Hyun Kim, Seoul (KR); Seung Hwan Bae, Incheon (KR); Seong Ho Lee, Incheon (KR)

(73) Assignees: Hyundai Motor Company, Seoul (KR); Kia Corporation, Seoul (KR); INCHEON NATIONAL UNIVERSITY RESEARCH & BUSINESS FOUNDATION, Incheon (KR)

( * ) Notice: Subject to any disclaimer, the term of this patent is extended or adjusted under 35 U.S.C. 154(b) by 500 days.

(21) Appl. No.: 17/308,791

(22) Filed: May 5, 2021

(65) Prior Publication Data
US 2022/0050998 A1 Feb. 17, 2022

(30) Foreign Application Priority Data
Aug. 12, 2020 (KR) .......................... 10-2020-0101356

(51) Int. Cl.
*G06N 20/00* (2019.01)
*G06F 18/214* (2023.01)
(Continued)

(52) U.S. Cl.
CPC ............ *G06V 20/64* (2022.01); *G06F 18/214* (2023.01); *G06N 20/00* (2019.01); *G06V 10/24* (2022.01); *G06V 10/62* (2022.01)

(58) Field of Classification Search
CPC ........ G06V 20/64; G06V 10/24; G06V 10/62; G06V 10/82; G06V 20/52; G06F 18/214; G06N 20/00; G06N 3/08; G06T 7/246; G06T 7/11; G06T 2207/20081; G06T 2210/12
See application file for complete search history.

(56) References Cited

U.S. PATENT DOCUMENTS

2019/0122065 A1* 4/2019 Ungarish ............. G06V 10/255
2021/0183074 A1* 6/2021 Kim ........................ G06F 18/22
(Continued)

OTHER PUBLICATIONS

"Confidence-Based Data Association and Discriminative Deep Appearance Learning for Robust Online Multi-Object Tracking", IEEE TPAMI, S.Bae and K. Yoon, 2018.
(Continued)

*Primary Examiner* — Dov Popovici
(74) *Attorney, Agent, or Firm* — MORGAN, LEWIS & BOCKIUS LLP

(57) ABSTRACT

An apparatus for controlling object tracking and a method therefor are provided. The apparatus includes an object detector configured to detect an object in an image, an object tracker configured to track the object, a learning device configured to learn whether to enable the object detector based on features of the object and tracking results of the object tracker, and a controller configured to determine whether to enable the object detector by interworking with the learning device.

15 Claims, 14 Drawing Sheets

(51) Int. Cl.
G06V 10/24 (2022.01)
G06V 20/64 (2022.01)
G06V 10/62 (2022.01)

(56) References Cited

U.S. PATENT DOCUMENTS

2022/0392107 A1* 12/2022 Kitazawa ............. G06V 10/761
2023/0069608 A1*  3/2023 Yoon ...................... G06T 3/40
2023/0294628 A1*  9/2023 Park .................. B60R 21/01538
                                                     382/104

OTHER PUBLICATIONS

"MobileNet v2: Inverted Residuals and Linear Bottlenecks", CVPR, Sandler, M. Howard A., Zhu M., Zhmoginov, A. and Chen, L.C, 2018.
"Yolov3: An Incremental Improvement.", arXiv:1804.02767, Redmon, J., and Farhadi, A., 2018.

* cited by examiner $$R\Big(A\big(D(x_{f_k}, \bar{T}_f)\big)\Big) = 0.8$$

$$R\Big(A\big(D(x_{f_k}, \bar{T}_f)\big)\Big) = 1$$

|  | | 710 | | 720 | | 730 | | 740 | | 750 | |
|---|---|---|---|---|---|---|---|---|---|---|---|
| | Sequence name | w/o interval | | w. 1 interval | | w. 3 interval | | w. 5 interval | | ours | |
| Static motion | | TRACKING | DETECTION + TRACKING | TRACKING | DETECTION + TRACKING | TRACKING | DETECTION + TRACKING | TRACKING | DETECTION + TRACKING | TRACKING | DETECTION + TRACKING |
| | train_00124005 (D1) | 0 | 138 | 69 | 69 | 104 | 34 | 115 | 23 | 74 | 64 |
| | test_00209000 (D2) | 0 | 450 | 223 | 227 | 334 | 116 | 371 | 79 | 308 | 142 |
| | train_00073005 (D3) | 0 | 81 | 38 | 43 | 57 | 24 | 64 | 17 | 41 | 40 |
| | test_00253005 (D4) | 0 | 82 | 39 | 43 | 58 | 24 | 65 | 17 | 32 | 50 |
| | test_00043002 (D5) | 0 | 86 | 43 | 43 | 65 | 21 | 72 | 14 | 56 | 30 |
| | test_00076028 (D6) | 0 | 56 | 28 | 28 | 42 | 14 | 47 | 9 | 25 | 31 |
| | test_00043050 (D7) | 0 | 91 | 46 | 45 | 69 | 22 | 76 | 15 | 32 | 59 |
| Dynamic motion | Average | 0 | 140.57 | 69.43 | 71.14 | 104.14 | 36.43 | 115.71 | 24.86 | 81.14 | 59.43 |

FIG.7A

APPARATUS FOR CONTROLLING OBJECT TRACKING AND METHOD THEREFOR

CROSS-REFERENCE TO RELATED APPLICATION

This application claims priority to and the benefit of Korean Patent Application No. 10-2020-0101356, filed on Aug. 12, 2020, the entire contents of which are incorporated herein by reference.

TECHNICAL FIELD

The present disclosure relates to determining whether to operate an object detector using a scheduler model based on reinforcement learning.

BACKGROUND

In general, rather than training data used for supervised or unsupervised learning, reinforcement learning provides rewards for the result of an action tailored to a given state.

For example, when learning a computer program playing chess, because there are too many cases and when there is no determined one answer, it is not easy to provide the output (the most suitable action) for the input (the given state) as training data. However, when the chess game is ended, a learning algorithm may be notified of whether a series of moves (actions) immediately before the chess game is ended are good or bad. Notifying the learning device of the good or bad degree of the action is called reward or reinforcement. Machine learning using such information is reinforcement learning.

The computer program, which is a target of the reinforcement learning, is called an agent. The agent establishes a policy representing an action the agent will takes in the given state. The aim of the reinforcement learning is to learn the agent to establish a policy capable of receiving the maximum reward.

Meanwhile, because the autonomous vehicle should recognize surrounding environments for itself and should move safely, it is essential for a technology of detecting and tracking multiple objects in real time at high accuracy. Thus, the autonomous vehicle is basically equipped with an object tracking system including an object detect for detecting an object in the image and an object tracker for tracking an object in the image.

Such an object tracking system operates the object detector and the object tracker for each frame of the image to track the object. In this case, an object detection speed of the object detector is about 30 Hz and is slower than an object tracking speed of about 100 Hz in the object tracker.

Thus, to improve performance of the object tracking system, a method for operating the object detector per even frame or odd frame may be considered. However, because it is able for the method to considerably reduce the accuracy of object tracking, rather the method may degrade the performance of the object tracking system.

Details described in the background art are written to increase the understanding of the background of the present disclosure, which may include details rather than an existing technology well known to those skilled in the art.

SUMMARY

An aspect of the present disclosure provides an apparatus for controlling object tracking to learn whether to enable an object detector in response to features of an object in an image and tracking results of an object tracker, based on reinforcement learning, and determine whether to enable the object detector based on the learned result to improve a tracking speed of the object while keeping the accuracy of object tracking constant and a method therefor.

The technical problems to be solved by the present inventive concept are not limited to the aforementioned problems, and any other technical problems not mentioned herein will be clearly understood from the following description by those skilled in the art to which the present disclosure pertains. Furthermore, it may be easily seen that purposes and advantages of the present disclosure may be implemented by means indicated in claims and a combination thereof.

According to an aspect of the present disclosure, an apparatus for controlling tracking of an object may include an object detector that detects an object in an image, an object tracker that track the object, a learning device that learns whether to enable the object detector based on features of the object and tracking results of the object tracker, and a controller that determines whether to enable the object detector by interworking with the learning device.

In some forms of the present disclosure, the learning unit may learn a scheduler model based on reinforcement learning.

In some forms of the present disclosure, the controller may disable the object detector, when an output value of the scheduler model is greater than a threshold, and may enable the object detector, when the output value of the scheduler model is not greater than the threshold.

In some forms of the present disclosure, the learning unit may determine a reward based on a difference between a predicted result of the scheduler model with respect to the features of the object and the tracking results of the object tracker and a real result.

In some forms of the present disclosure, the learning unit may determine the reward with further regard to the number of real bounding boxes for the object and the number of bounding boxes as the tracking results.

In some forms of the present disclosure, the learning unit may determine a value corresponding to a difference in the number of the bounding boxes as a plus reward, when the predicted result of the scheduler model and the real result are identical to each other.

In some forms of the present disclosure, the learning unit may determine a value corresponding to a difference in the number of the bounding boxes as a minus reward, when the predicted result of the scheduler model and the real result are not identical to each other.

In some forms of the present disclosure, the learning unit may determine the reward with further regard to an overlapped degree between a region of a real bounding box for the object and a region of a bounding box as the tracking results.

In some forms of the present disclosure, the learning unit may determine a value corresponding to the overlapped degree between the regions of the bounding boxes as a plus reward, when the predicted result of the scheduler model and the real result are identical to each other.

In some forms of the present disclosure, the learning unit may determine a value corresponding to the overlapped degree between the regions of the bounding boxes as a minus reward, when the predicted result of the scheduler model and the real result are not identical to each other.

According to another aspect of the present disclosure, a method for controlling tracking of an object may include learning, by a learning device, whether to enable an object detector based on features of an object and tracking results of an object tracker and determining, by a controller, whether to enable the object detector by interworking with the learning device.

In some forms of the present disclosure, the learning may include learning a schedule model based on reinforcement learning.

In some forms of the present disclosure, the determining of whether to enable the object detector may include disabling the object detector, when an output value of the scheduler model is greater than a threshold and enabling the object detector, when the output value of the scheduler model is not greater than the threshold.

In some forms of the present disclosure, the learning of the scheduler model may include determining a reward based on a difference between a predicted result of the scheduler model with respect to the features of the object and the tracking results of the object tracker and a real result, the number of real bounding boxes for the object, and the number of bounding boxes as the tracking results.

In some forms of the present disclosure, the determining of the reward may include determining a value corresponding to a difference in the number of the bounding boxes as a plus reward, when the predicted result of the scheduler model and the real result are identical to each other and determining a value corresponding to a difference in the number of the bounding boxes as a minus reward, when the predicted result of the scheduler model and the real result are not identical to each other.

In some forms of the present disclosure, the learning of the scheduler model may include determining a reward based on a difference between a predicted result of the scheduler model with respect to the features of the object and the tracking results of the object tracker and a real result and an overlapped degree between a region of a real bounding box for the object and a region of a bounding box as the tracking results.

In some forms of the present disclosure, the determining of the reward may include determining a value corresponding to the overlapped degree between the regions of the bounding boxes as a plus reward, when the predicted result of the scheduler model and the real result are identical to each other and determining the value corresponding to the overlapped degree between the regions of the bounding boxes as a minus reward, when the predicted result of the scheduler model and the real result are not identical to each other.

DRAWINGS

The above and other objects, features and advantages of the present disclosure will be more apparent from the following detailed description taken in conjunction with the accompanying drawings:

FIGS. 7A and 7B are drawings illustrating performance analysis of an apparatus for controlling object tracking in some forms of the present disclosure;

DETAILED DESCRIPTION

Figure 1:
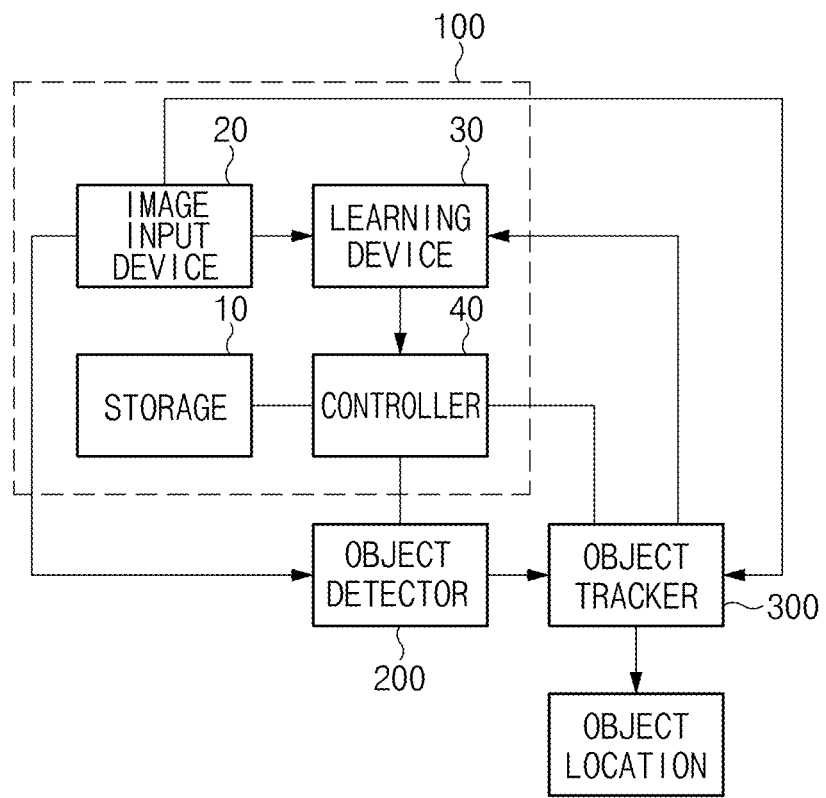
FIG. 1 is a block diagram illustrating a configuration of an apparatus for controlling object tracking in some forms of the present disclosure.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing some forms of the present disclosure, a detailed description of well-known features or functions will be ruled out in order not to unnecessarily obscure the gist of the present disclosure.

In some forms of the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of an apparatus for controlling object tracking in some forms of the present disclosure.

As shown in FIG. 1, an apparatus 100 for controlling object tracking in some forms of the present disclosure may include a storage 10, an image input device 20, a learning device 30, and a controller 40. In this case, the respective components may be combined into one component and some components may be omitted, depending on a manner which executes the apparatus 100 for controlling the object tracking in some forms of the present disclosure. Particularly, the function of the learning device 30 may be implemented to be performed by the controller 40.

Seeing the respective components, first of all, the storage 10 may store various logics, algorithms, and programs required in a process of learning whether enable an object detector 200, in response to features of an object in an image and tracking results of an object tracker 300, based on reinforcement learning, and determining whether to enable the object detector 200, based on the learned result.

The storage 10 may store a scheduler model as the result of completing the learning in the learning device 30.

Such a storage 10 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The image input device 20 may input an image for learning to the learning device 30, the object detector 200, and the object tracker 300 on a frame-by-frame basis.

The image input device 20 may input an image captured by a camera loaded into an autonomous vehicle to the learning device 30, the object detector 200, and the object tracker 300 on a frame-by-frame basis.

The learning device 30 may learn whether to enable the object detector 200 based on features of an object in an image input through the image input device 20 and tracking results of the object tracker 300, based on reinforcement learning.

The learning device 30 may generate the scheduler model as the result of completing the learning.

The controller 40 may perform the overall control such that respective components may normally perform their own functions. Such a controller 40 may be implemented in the form of hardware, may be implemented in the form of software, or may be implemented in the form of a combination thereof. Preferably, the controller 40 may be implemented as, but not limited to, a microprocessor.

Particularly, the controller 40 may perform a variety of control in a process of learning whether enable the object detector 200, in response to features of an object in an image and tracking results of the object tracker 300, based on reinforcement learning, and determining whether to enable the object detector 200, based on the learned result (the scheduler model).

Figure 2A:
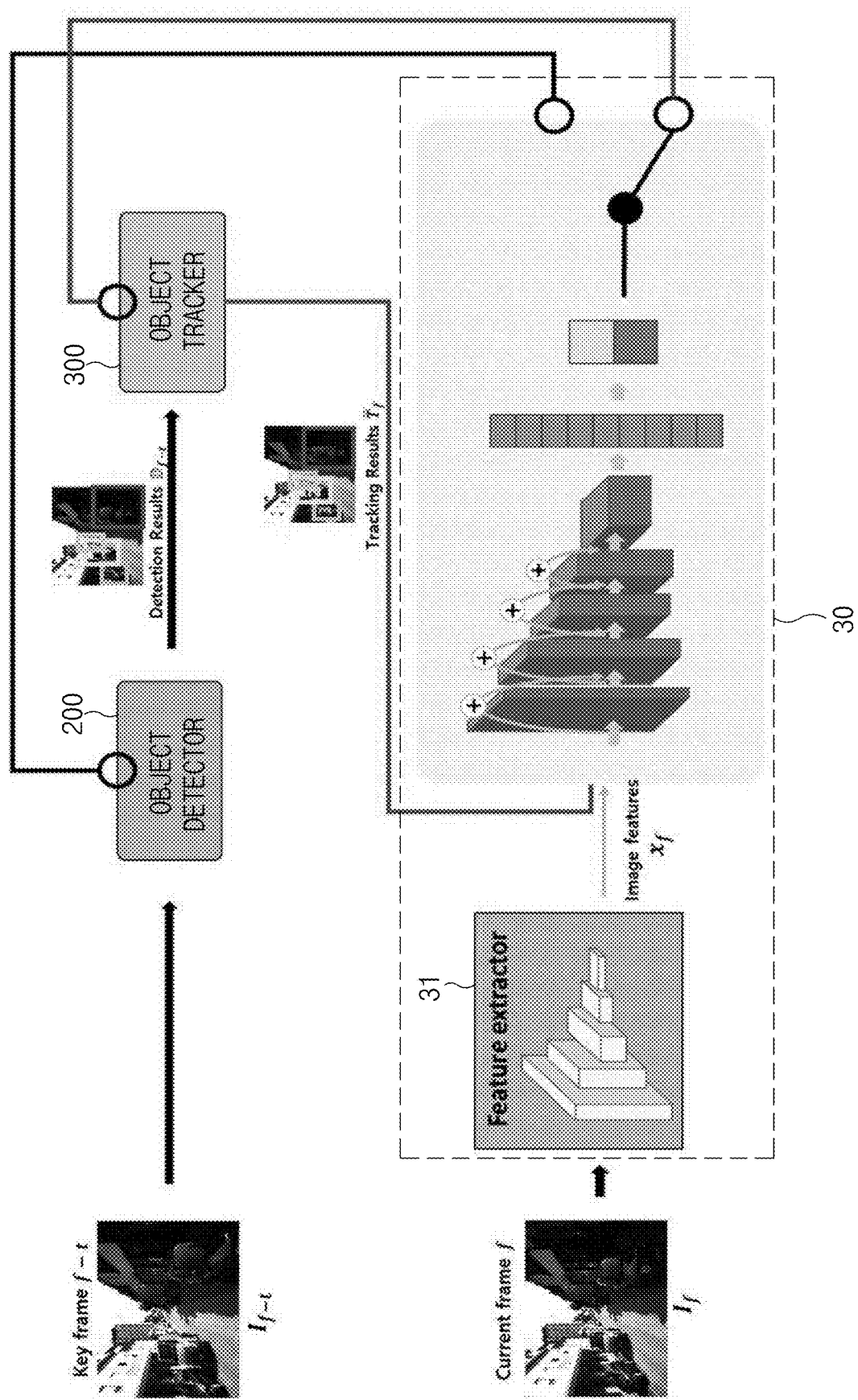
FIG. 2A is a drawing illustrating a state where an apparatus for controlling object tracking disables an object detector in some forms of the present disclosure.
Figure 2B:
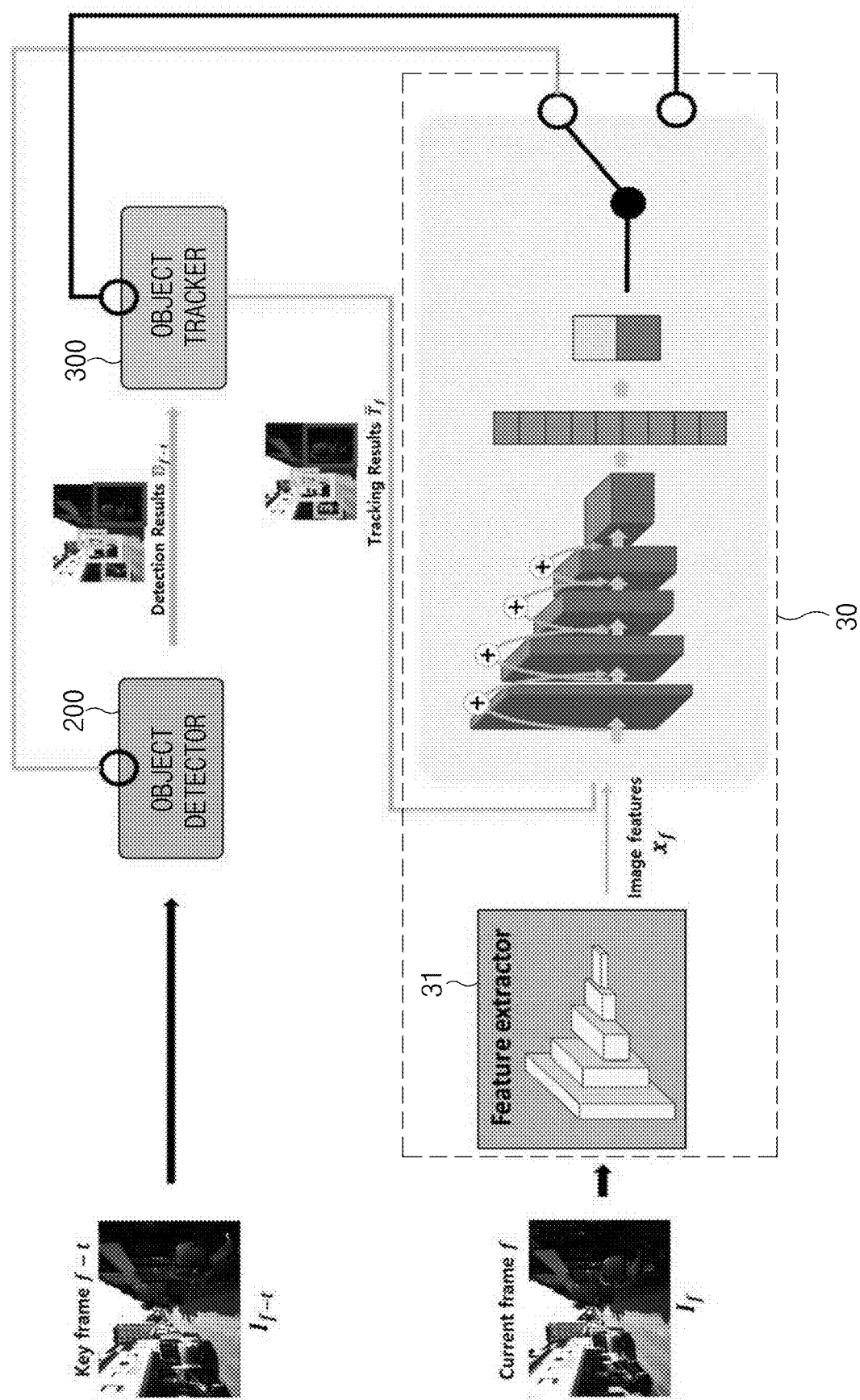
FIG. 2B is a drawing illustrating a state where an apparatus for controlling object tracking enables an object detector in some forms of the present disclosure.

When the output (e.g., a value between 0 to 1) of the scheduler model is greater than a threshold (e.g., 0.7), the controller 40 may determine that tracking accuracy of the object tracker 300 is greater than or equal to a certain level and, as shown in FIG. 2A, may disable the object detector 200. When the output of the scheduler model is not greater than the threshold, the controller 40 may determine that the tracking accuracy of the object tracker 300 is less than the certain level and, as shown in FIG. 2B, may enable the object detector 200.

The object detector 200 may be a module for detecting an object from an image input through the image input device 20, which may detect the object in various manners which are generally and widely known.

The object tracker 300 may be a module for tracking the object detected by the object detector 200, which may track the object in various manners which are generally and widely known.

FIG. 2A is a drawing illustrating a state where an apparatus for controlling object tracking disables an object detector in some forms of the present disclosure.

As shown in FIG. 2A, a key frame $I_{f-t}$ at a previous time may be input to an object detector 200, and detection results $D_{f-t}$ of the object detector 200 may be input to an object tracker 300. The object tracker 300 may track an object detected by the object detector 200 and may input the tracking results $T_f$ to the learning device 30. In this case, the detection results $D_{f-t}$ of the object detector 200 may not be input to the learning device 30. The learning device 30 may extract image features $x_f$ from a current frame $I_f$ (see reference numeral 31) and may set the extracted image features $x_f$ and the tracking results $T_f$ of the object tracker 300 to a state (state=$(x^f, T_f)$).

FIG. 2B is a drawing illustrating a state where an apparatus for controlling object tracking enables an object detector in some forms of the present disclosure.

As shown in FIG. 2B, a key frame $I_{f-t}$ at a previous time may be input to an object detector 200, and detection results $D_{f-t}$ of the object detector 200 may be input to an object tracker 300. The object tracker 300 may track an object detected by the object detector 200 and may input the tracking results $T_f$ to the learning device 30. In this case, the detection results $D_{f-t}$ of the object detector 200 may also be input to the learning device 30. The learning device 30 may extract image features $x_f$ from a current frame $I_f$ (see reference numeral 31) and may set the extracted image features $x_f$ and the tracking results $T_f$ of the object tracker 300 to a state (state=$(x_f, T_f)$).

The controller 40 may determine whether to enable the object detector 200 using the scheduler model generated based on reinforcement learning, thus more quickly tracking the object at more accuracy than a manner which disables the object detector 200 with respect to an odd-numbered frame, a manner which disables the object detector 200 with respect to a 3 multiple numbered frame, and a manner which disables the object detector 200 with respect to a 5 multiple numbered frame.

Hereinafter, the learning process of the learning device 30 will be described in detail with reference to FIG. 3.

Figure 3:
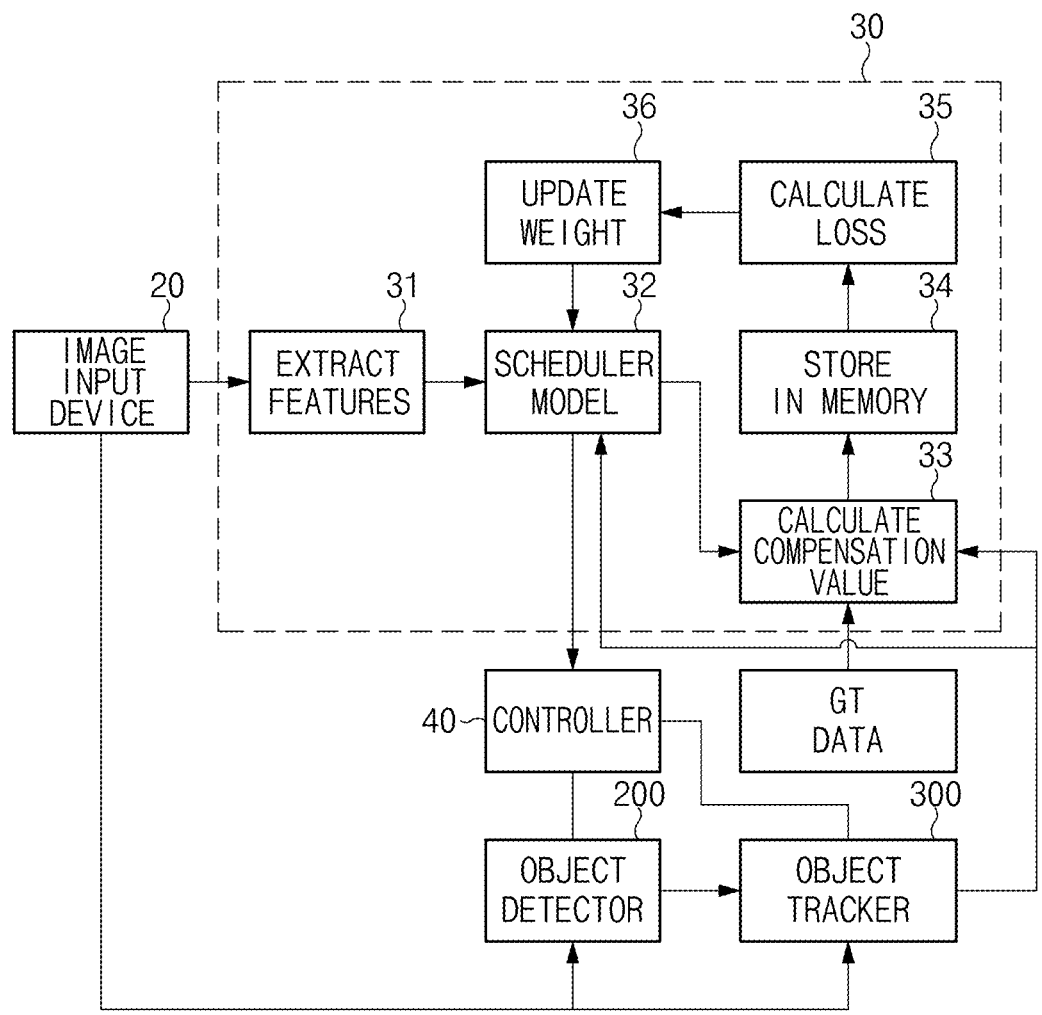
FIG. 3 is a block diagram illustrating an operation of a learning device provided in an apparatus for controlling object tracking in some forms of the present disclosure.

FIG. 3 is a block diagram illustrating an operation of a learning device provided in an apparatus for controlling object tracking in some forms of the present disclosure.

First of all, in process 31, a learning device 30 may extract features for each frame of an image for learning, which is input via an image input device 20. In this case, the learning device 30 may further include a feature extractor for extracting image features. Furthermore, the features may be information specifying an object, which may include a feature for a shape of a person, a feature for a shape of a vehicle, a feature for a shape of a road structure, a feature for a shape of an animal, or the like. Such features may be represented in various manners, such as an edge component, a diagonal component, a color component, a horizontal component, and a vertical component, which are generally and widely known.

When such an image for learning is input to an object tracker 300, and the object tracker 300 may input object tracking results to a scheduler model 32 for each frame of the image for learning.

The schedule model 32 may take an action for image features $x_f$ and tracking results $T_f$ as a state. In other words, the output of the scheduler model 32 in the learning process may be disabling (0) or enabling (1) of an object detector 200.

Thereafter, in process 33, the learning device 30 may calculate a reward for the action of the scheduler model 32.

In process 33, the learning device 30 may receive the output value (0 or 1) of the scheduler model 32 and may receive ground truth (GT) data and tracking results of the object tracker 300. In this case, the GT data G may be represented in the form of Equation 1 below and the tracking results B of the object tracker 300 may be represented in the form of Equation 2 below.

$$G=\{G_f\}_{f=1}^N, G_f=\{\{d_i\}_{i=1}^M, y_f\} \quad \text{[Equation 1]}$$

Herein, N denotes the number of frames of the image, M denotes the number of objects, and $d_i$ denotes information ($d_i$=[dx, dy dw, dh]) about the bounding box indicating the object in the image, which may include a location, a size, and the like of the bounding box. Furthermore, $y_f$ is the action, which may include 0 and 1 ($1_A$ or $1_B$). In this case, 0 indicates disabling of the object detector 200 and 1 ($1_A$ or $1_B$) indicates enabling of the object detector 200.

$$B=\{B_f\}_{f=1}^N, B_f=\{\{\hat{d}_i\}_{i=1}^{|T_f|}, \hat{y}_f\} \quad \text{[Equation 2]}$$

Herein, $T_f$ denotes the tracking results of the object tracker 300, '|·|' denotes the cardinality, N denotes the number of frames of the image, and $\hat{d}_i$ denotes information ($d_i$=[dx, dy dw, dh]) about the bounding box indicating the object in the tracked image, which may include the location, the size, and the like of the bounding box. Furthermore, $\hat{y}_f$ denotes the predicted action, which may include 0 and 1. In this case, 0 indicates disabling of the object detector 200, and 1 indicates enabling of the object detector 200.

In process 33, the learning device 30 may calculate a reward R based on Equations 3 to 5 below.

$$R(A(D(x_f, \overline{T}_f))) = \quad \text{[Equation 3]}$$
$$\begin{cases} \alpha \cdot \exp(-|||B_f|-|G_f|||), & \text{if } \hat{y}_f = 1 \ [0, \alpha] \\ -\alpha \cdot (1 - \exp(-|||B_f|-|G_f|||)), & \text{if } \hat{y}_f = 0 \ [-\alpha, 0] \end{cases}$$

Equation 3 above is an equation applied when $y_f=1_A$. When $\hat{y}_f=1$, the learning device 30 may calculate a reward using the top equation. When $\hat{y}_f=0$, the learning device 30 may calculate a reward using the bottom equation. In this case, the reward calculated when $\hat{y}_f=0$ may refer to a penalty actually.

For example, in the top equation, the reward R becomes a as a maximum value when $|B_f|-|G_f|=°$ and may become 0 when $|B_f|-|G_f|=-\infty$. In the bottom equation, the reward R becomes 0 as a maximum value when $|B_f|-|G_f|=0$ and may become $-\alpha$ when $|B_f|-|G_f|=-\infty$.

In Equation 3 above, D denotes the number of bounding boxes tracked based on $x_f$ and $T_f$, A denotes the action based on the number of bounding boxes, R denotes the reward for the action, $B_f$ denotes the tracked bounding box, $G_f$ denotes the real (GT data) bounding box, "||||" denotes calculation calculating the number, a denotes the maximum value, and $-\alpha$ denotes the minimum value.

As a result, the learning device 30 may calculate a reward according to a difference in the number of bounding boxes between $B_f$ and $G_f$ based on Equation 3 above.

Figure 4A:
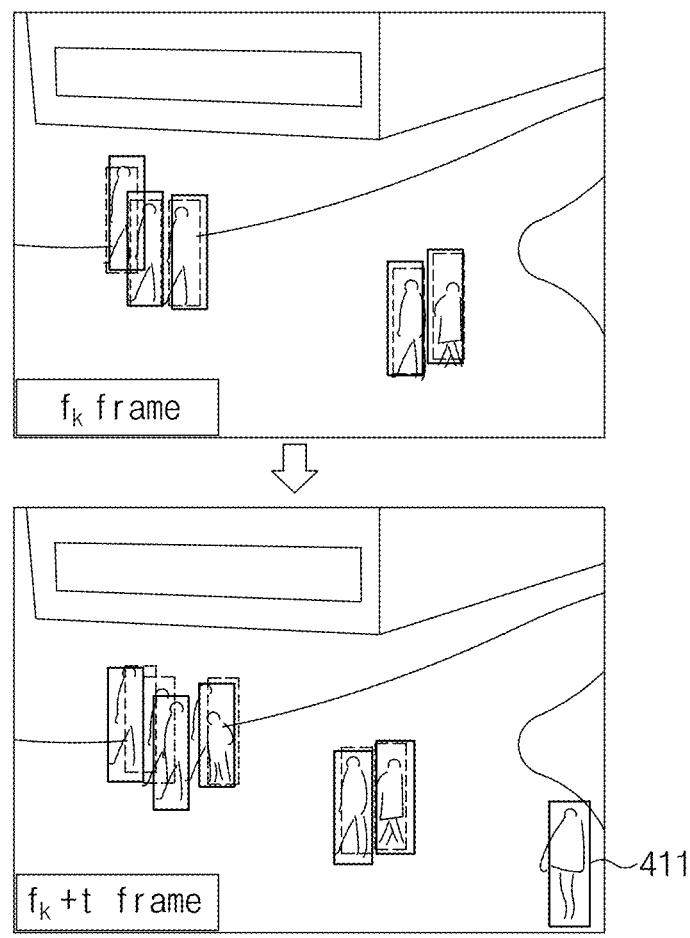
FIG. 4A is a drawing illustrating a reward calculated based on the number of bounding boxes by a learning device provided in an apparatus for controlling object tracking in some forms of the present disclosure.

FIG. 4A is a drawing illustrating a reward calculated based on the number of bounding boxes by a learning device provided in an apparatus for controlling object tracking in some forms of the present disclosure.

As shown in FIG. 4A, it may be seen that the number of real (GT data) bounding boxes (solid boxes) and the number of tracked bounding boxes (dotted boxes) are identical to each other on frame $f_k$. However, due to a bounding box 411 newly added on frame $F_k$+t, the number of real bounding boxes is more than the number of tracked bounding boxes by 1. When substituting it into the top equation used when $\hat{y}_f=1$, the reward shown in FIG. 4A may be calculated.

Figure 4B:
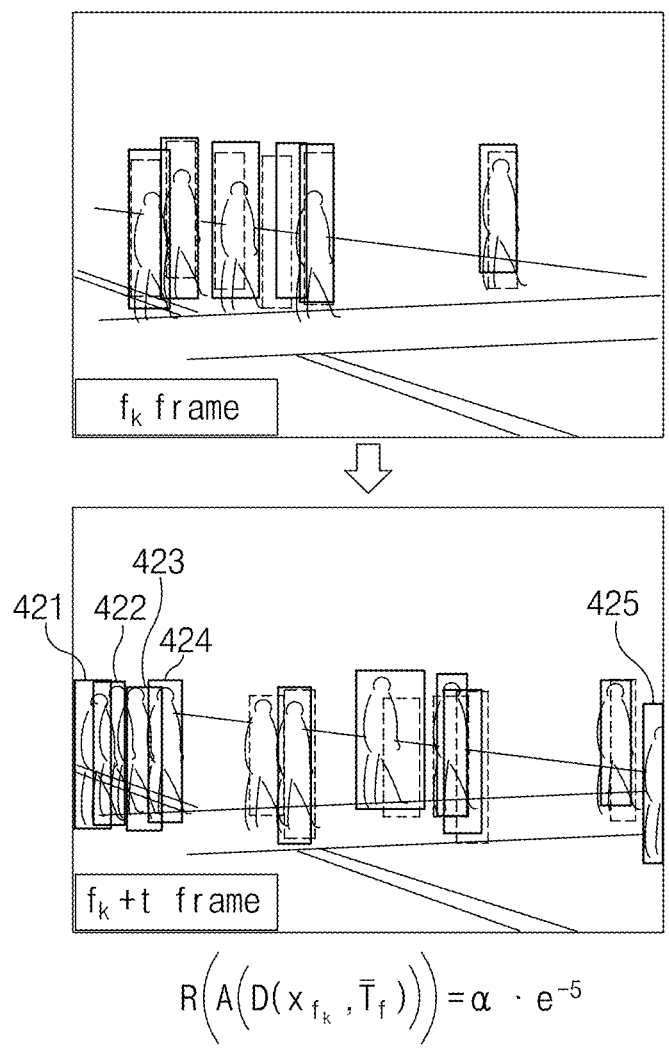
FIG. 4B is another drawing illustrating a reward calculated based on the number of bounding boxes by a learning device provided in an apparatus for controlling object tracking in some forms of the present disclosure.

FIG. 4B is another drawing illustrating a reward calculated based on the number of bounding boxes by a learning device provided in an apparatus for controlling object tracking in some forms of the present disclosure.

As shown in FIG. 4B, it may be seen that the number of real (GT data) bounding boxes (solid boxes) and the number of tracked bounding boxes (dotted boxes) are identical to each other on frame $f_k$. However, due to bounding boxes 421 to 425 newly added on frame $F_k$+t, the number of real bounding boxes is more than the number of tracked bounding boxes by 5. When substituting it into the top equation used when 1, the reward shown in FIG. 4B may be calculated.

$$R(A(D(x_f, \overline{T}_f))) = \quad \text{[Equation 4]}$$
$$\begin{cases} Avg(IOU(B_f, G_f)), & \text{if } \hat{y}_f = 1 \ [0, 1] \\ -(1 - Avg(IOU(B_f, G_f))), & \text{if } \hat{y}_f = 0 \ [-1, 0] \end{cases}$$

Equation 4 above is an equation applied when $y_f=1_B$. When $\hat{y}_f=1$, the learning device 30 may calculate a reward using the top equation. When $\hat{y}_f=0$, the learning device 30 may calculate a reward using the bottom equation. In this case, the reward calculated when $\hat{y}_f=0$ may refer to a penalty actually.

For example, in the top equation, the reward R becomes 1 as a maximum value when avg(IOU($B_f$, $G_f$))=1 and may become 0 when avg(IOU($B_f$, $G_f$))=0. In the bottom equation, the reward R becomes 0 as a maximum value when avg (IOU($B_f$, $G_f$))=1 and may become −1 when avg(IOU($B_f$, $G_f$))=0.

In Equation 4 above, D denotes the number of bounding boxes tracked based on $x_f$ and $T_f$, denotes the action based on the number of bounding boxes, R denotes the reward for the action, $B_f$ denotes the tracked bounding box, $G_f$ denotes the real (GT data) bounding box, "IOU" is 'Intersection Over Union' and denotes the value obtained by dividing the area of the intersection region of two bounding boxes by the area of the sum region, and 'avg' denotes the average.

As a result, the learning device 30 may calculate a reward according to an overlapped degree between $B_f$ and $G_f$ based on Equation 4 above.

Figure 5A:
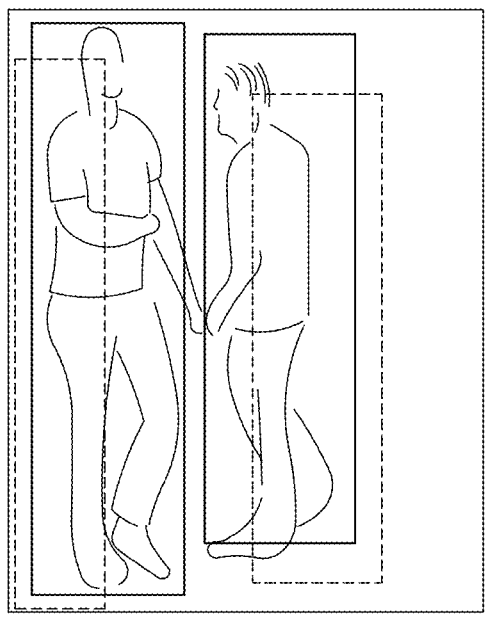
FIG. 5A is a drawing illustrating a reward calculated based on an overlapped degree of bounding boxes by a learning device provided in an apparatus for controlling object tracking in some forms of the present disclosure.

FIG. 5A is a drawing illustrating a reward calculated based on an overlapped degree of bounding boxes by a learning device provided in an apparatus for controlling object tracking in some forms of the present disclosure.

As shown in FIG. 5A, it may be seen that an overlapped degree between a region of a real (GT data) bounding box (a solid box) and a region of a tracked bounding box (a dotted box) is low in the image. When substituting it into the top equation used when $\hat{y}_f=1$, the reward may become 0.4.

Figure 5B:
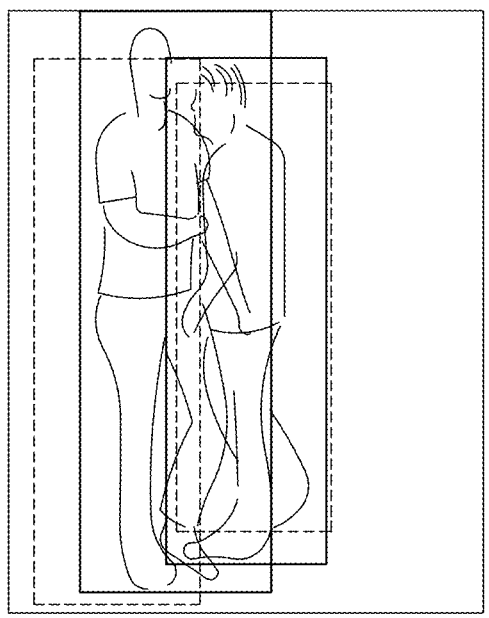
FIG. 5B is another drawing illustrating a reward calculated based on an overlapped degree of bounding boxes by a learning device provided in an apparatus for controlling object tracking in some forms of the present disclosure.

FIG. 5B is another drawing illustrating a reward calculated based on an overlapped degree of bounding boxes by a learning device provided in an apparatus for controlling object tracking in some forms of the present disclosure.

As shown in FIG. 5B, it may be seen that an overlapped degree between a region of a real (GT data) bounding box (a solid box) and a region of a tracked bounding box (a dotted box) is high in the image. When substituting it into the top equation used when $\hat{y}_f=1$, the reward may become 0.8.

$$R(A(D(x_f, T_f))) = \begin{cases} 1, & \text{if } \hat{y}_f = 0 \\ -1, & \text{if } \hat{y}_f = 1 \end{cases} \quad \text{[Equation 5]}$$

Equation 5 above is a reward R applied when $y_f=0$. When $\hat{y}_f=0$, the learning device 30 may determine the reward as 1. When $\hat{y}_f=1$, the learning device 30 may determine the reward as −1. In this case, the reward when $\hat{y}_f=1$ may refer to a penalty actually.

As a result, the learning device 30 may determine a reward depending on whether a predicted result (0 or 1) of the scheduler model 32 and a real result (0) are identical to each other. Herein, 0 as the predicted result refers to disabling of the object detector 200, and 1 as the predicted result refers to enabling of the object detector 200.

Figure 6A:
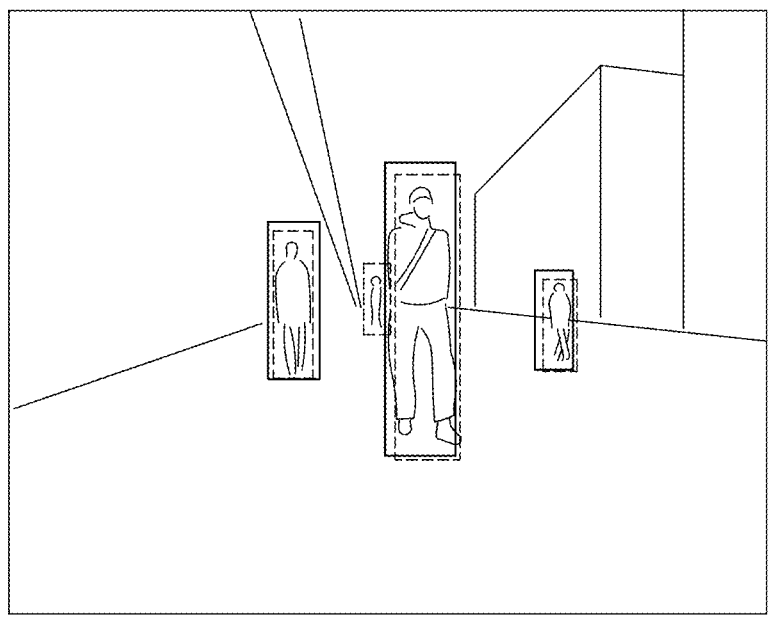
FIG. 6A is a drawing illustrating a reward determined when a predicted result of a scheduler model and a real result (0) are identical to each other by a learning device provided in an apparatus for controlling object tracking in some forms of the present disclosure.

FIG. 6A is a drawing illustrating a reward determined when a predicted result of a scheduler model and a real result (0) are identical to each other by a learning device provided in an apparatus for controlling object tracking in some forms of the present disclosure.

As shown in FIG. 6A, a sold box indicates a real (GT data) bounding box in the image, and a dotted box indicates a bounding box tracked by an object tracker 300. Because a real result ($y_f=0$) and a predicted result (0) of a scheduler model 32 are identical to each other, a learning device 30 may determine a reward as 1.

Figure 6B:
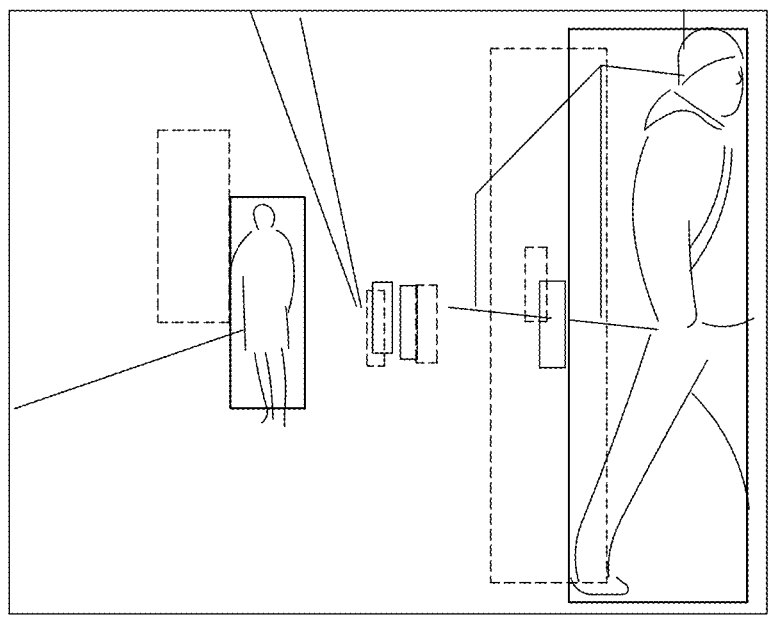
FIG. 6B is a drawing illustrating a reward determined when a predicted result of a scheduler model and a real result (0) are not identical to each other by a learning device provided in an apparatus for controlling object tracking in some forms of the present disclosure.

FIG. 6B is a drawing illustrating a reward determined when a predicted result of a scheduler model and a real result (0) are not identical to each other by a learning device provided in an apparatus for controlling object tracking in some forms of the present disclosure.

As shown in FIG. 6B, a sold box indicates a real (GT data) bounding box in the image, and a dotted box indicates a bounding box tracked by an object tracker 300. Because a real result ($y_f=0$) and a predicted result (1) of a scheduler model 32 are different from each other, a learning device 30 may determine a reward as −1.

Meanwhile, because processes 34 to 36 are operations generally performed in reinforcement learning, they will be described in brief.

In process 34, the learning device 30 may store information about a state, a reward corresponding to the state, and information about a next state in a replay-memory.

In process 35, the learning device 30 may extract a reference number of samples from the replay-memory to generate mini-batch and may calculate loss using the generated mini-batch. In other words, the learning device 30 may calculate the loss using a loss function (e.g., Huber loss).

In process 36, the learning device 30 may update a weight of a scheduler model 32 by applying the calculated loss to a backpropagation algorithm.

Figure 7B:

FIGS. 7A and 7B are drawings illustrating performance analysis of an apparatus for controlling object tracking in some forms of the present disclosure.

In FIG. 7A, reference numeral '710' indicates when an object detector 200 is always enabled, reference numeral '720' indicates when the object detector 200 is enabled at intervals of 1 frame, reference numeral '730' indicates when the object detector 200 is enabled at intervals of 3 frames, reference numeral '740' indicates when the object detector 200 is enabled at intervals of 5 frames, and reference numeral '750' indicates when the object detector 200 is enabled by the apparatus for controlling the object tracking in some forms of the present disclosure.

The average number of times the object detector 200 is enabled is 140.57 in reference numeral '710'. The average number of times the object detector 200 is enabled is 71.14 in reference numeral '720'. The average number of times the object detector 200 is enabled is 36.43 in reference numeral '730'. The average number of times the object detector 200 is enabled is 24.86 in reference numeral '740'. The average number of times the object detector 200 is enabled is 59.43 in reference numeral '750'. Thus, a tracking speed in reference numeral '750' may be faster than a tracking speed in reference numeral '720' and may be slower than a tracking speed in reference numeral '730'.

In general, the more the number of times the object detector 200 is enabled increases, the more the accuracy of object tracking of an object tracker 300 increases. In FIG. 7A, the number of times the object detector 200 is enabled in reference numeral '750' is less than that in reference numeral '720' and is greater than that in reference numeral '730'. Thus, the accuracy of tracking in reference numeral '750' should be lower than that in reference numeral '720' and should be higher than that in reference numeral '730'.

However, as shown in FIG. 7B, it may be seen that the accuracy of tracking in reference numeral '750' is 85.88 and is higher than the accuracy (81.70) of tracking in reference numeral '720'.

As a result, the apparatus 100 for controlling the object tracking in some forms of the present disclosure may keep the accuracy of the object tracking constant compared to that in reference numeral '710', thus improving a tracking speed of the object.

Figure 8:
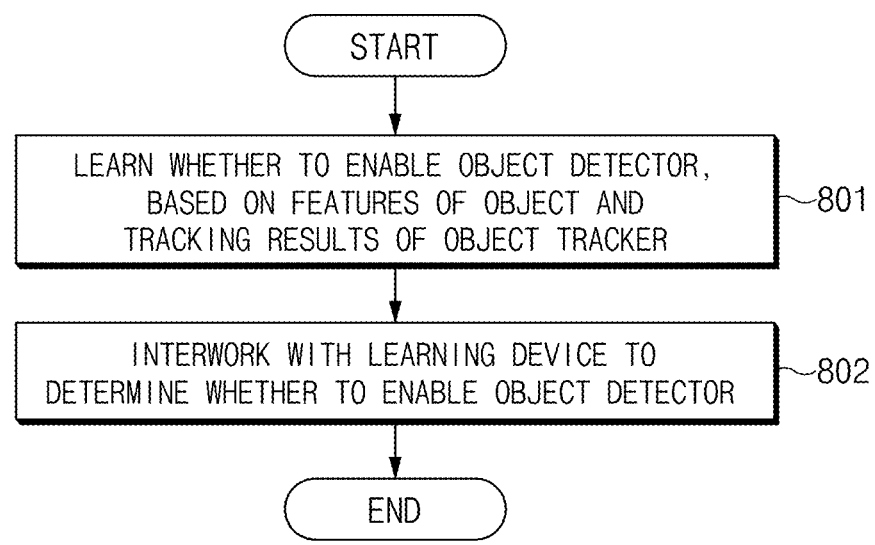
FIG. 8 is a flowchart illustrating a method for controlling object tracking in some forms of the present disclosure.

FIG. 8 is a flowchart illustrating a method for controlling object tracking in some forms of the present disclosure.

First of ally, in operation 801, a learning device 30 may learn whether to enable an object detector 200 based on features of an object and tracking results of an object tracker 300. In other words, the learning device 30 may learn a scheduler model 32.

Thereafter, in operation 802, a controller 40 may interwork with the learning device 30 to determine whether to enable the object detector 200.

Figure 9:
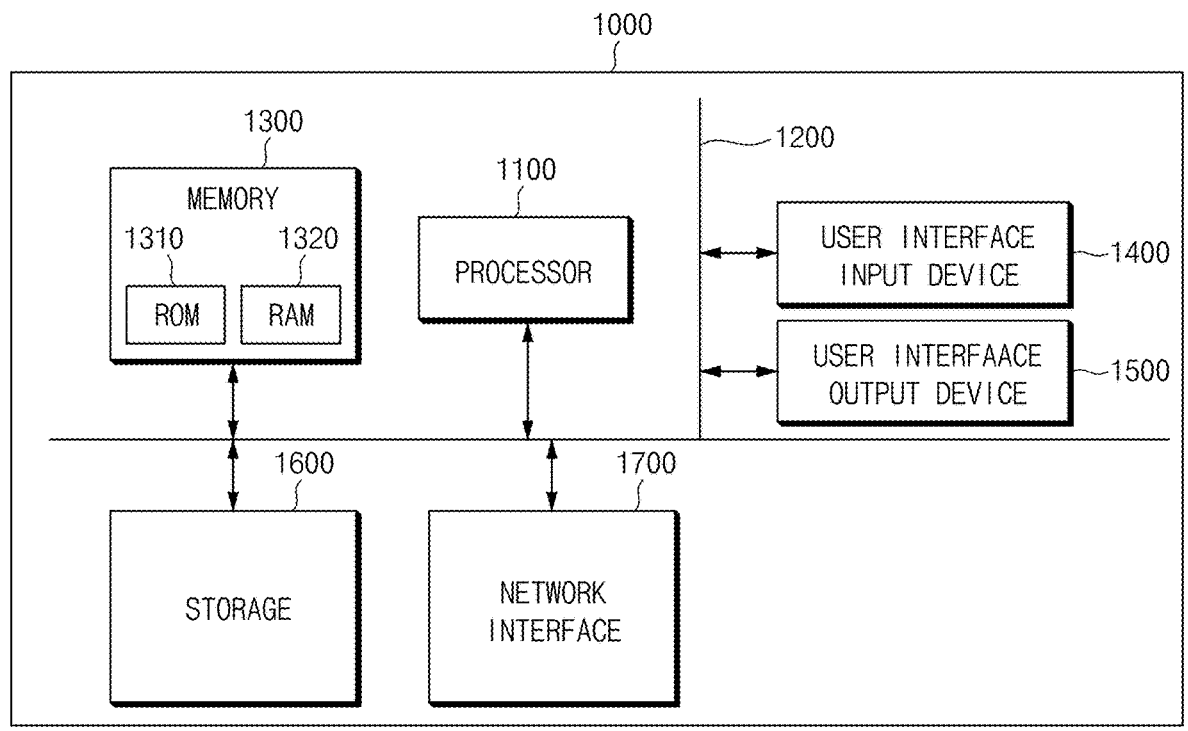
FIG. 9 is a block diagram illustrating a computing system for executing a method for controlling object tracking in some forms of the present disclosure.

FIG. 9 is a block diagram illustrating a computing system for executing a method for controlling object tracking in some forms of the present disclosure.

Referring to FIG. 9, the above-mentioned method for controlling the object tracking in some forms of the present disclosure may be implemented by means of the computing system. A computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in some forms of the present disclosure may be embodied directly in hardware or a software module executed by the processor, or in a combination thereof. The software module may reside on a storage medium (that is, the memory 1300 and/or the storage 1600) such as a RAM, a flash memory, a ROM, an EPROM, an EEPROM, a register, a hard disk, a SSD (Solid State Drive), a removable disk, and a CD-ROM. The exemplary storage medium may be coupled to the processor, and the processor may read information out of the storage medium and may record information in the storage medium. Alternatively, the storage medium may be integrated with the processor. The processor and the storage medium may reside in an application specific integrated circuit (ASIC). The ASIC may reside within a user terminal. In another case, the processor and the storage medium may reside in the user terminal as separate components.

The apparatus for controlling the object tracking and the method therefor are provided to learn whether to enable an object detector in response to features of the object in the image and tracking results of an object tracker, based on reinforcement learning, and determine whether to enable the object detector based on the learned result, thus improving a tracking speed of the object while keeping the accuracy of object tracking constant.

Hereinabove, although the present disclosure has been described in some forms of the present disclosure and the accompanying drawings, the present disclosure is not limited thereto, but may be variously modified and altered by those skilled in the art to which the present disclosure pertains without departing from the spirit and scope of the present disclosure claimed in the following claims.

Therefore, some forms of the present disclosure are provided to explain the spirit and scope of the present disclosure, but not to limit them, so that the spirit and scope of the present disclosure is not limited by the forms of the present disclosure. The scope of the present disclosure should be construed on the basis of the accompanying claims, and all the technical ideas within the scope equivalent to the claims should be included in the scope of the present disclosure.

What is claimed is:

1. An apparatus for controlling object tracking, the apparatus comprising:
    a processor; and
    a non-transitory storage medium containing program instructions that, when executed by the processor, causes the apparatus to implement:
    an object detector to detect an object in an image;
    an object tracker to track the object;
    a learning device to learn whether to enable the object detector based on features of the object and tracking results of the object tracker; and
    a controller implemented by the processor to determine whether to enable the object detector by interworking with the learning device,
    wherein the program instructions when executed by the processor, cause the learning device to learn a scheduler model based on reinforcement learning.

2. The apparatus of claim 1, wherein the program instructions when executed by the processor, cause the controller to:
    disable the object detector when an output value of the scheduler model is greater than a threshold value; and
    enable the object detector when the output value of the scheduler model is equal to or less than the threshold value.

3. The apparatus of claim 1, wherein the program instructions when executed by the processor, cause the learning device to:
    determine a reward based on a difference between a predicted result of the scheduler model regarding the features of the object and the tracking results of the object tracker and a real result.

4. The apparatus of claim 3, wherein the program instructions when executed by the processor, cause the learning device to:
    determine the reward with further regard to a number of real bounding boxes for the object and a number of bounding boxes as the tracking results.

5. The apparatus of claim 4, wherein the program instructions when executed by the processor, cause the learning device to:
    determine that a value corresponding to a difference in the number of the bounding boxes is a plus reward, when the predicted result of the scheduler model and the real result are identical.

6. The apparatus of claim 4, wherein the program instructions when executed by the processor, cause the learning device to:
    determine that a value corresponding to a difference in the number of the bounding boxes is a minus reward, when the predicted result of the scheduler model and the real result are not identical.

7. The apparatus of claim 3, wherein the program instructions when executed by the processor, cause the learning device to:
    determine the reward with further regard to an overlapped degree between a region of a real bounding box for the object and a region of a bounding box as the tracking results.

8. The apparatus of claim 7, wherein the program instructions when executed by the processor, cause the learning device to:
    determine that a value corresponding to the overlapped degree between the regions of the bounding boxes is a plus reward when the predicted result of the scheduler model and the real result are identical.

9. The apparatus of claim 7, wherein the program instructions when executed by the processor, cause the learning device to:
    determine that a value corresponding to the overlapped degree between the regions of the bounding boxes is a minus reward when the predicted result of the scheduler model and the real result are not identical.

10. A method for controlling object tracking, the method comprising:
    learning, by a learning device implemented by a processor, whether to enable an object detector implemented by the processor based on features of an object and tracking results of an object tracker; and
    determining, by a controller implemented by the processor, whether to enable the object detector by interworking with the learning device,
    wherein learning whether to enable the object detector includes learning a scheduler model based on reinforcement learning.

11. The method of claim 10, wherein determining whether to enable the object detector comprises:
    when an output value of the scheduler model is greater than a threshold value, disabling the object detector; and
    when the output value of the scheduler model is equal to or less than the threshold value, enabling the object detector.

12. The method of claim 10, wherein learning the scheduler model comprises:

determining a reward based on a difference between a predicted result of the scheduler model and a real result, and a number of real bounding boxes for the object and a number of bounding boxes as the tracking results.

13. The method of claim 12, wherein the determining the reward comprises:
   when the predicted result of the scheduler model and the real result are identical, determining that a value corresponding to a difference in the number of the bounding boxes is a plus reward; and
   when the predicted result of the scheduler model and the real result are not identical, determining that a value corresponding to the difference in the number of the bounding boxes is a minus reward.

14. The method of claim 10, wherein learning the scheduler model comprises:
   determining a reward based on a difference between a predicted result of the scheduler model and a real result, and an overlapped degree between a region of a real bounding box for the object and a region of a bounding box as the tracking results.

15. The method of claim 14, wherein the determining the reward comprises:
   when the predicted result of the scheduler model and the real result are identical, determining that a value corresponding to the overlapped degree between the regions of the bounding boxes is a plus reward; and
   when the predicted result of the scheduler model and the real result are not identical, determining that the value corresponding to the overlapped degree between the regions of the bounding boxes is a minus reward.

\* \* \* \* \*